United States Patent
Boice et al.

[19]

[11] Patent Number: 5,978,029
[45] Date of Patent: Nov. 2, 1999

[54] REAL-TIME ENCODING OF VIDEO SEQUENCE EMPLOYING TWO ENCODERS AND STATISTICAL ANALYSIS

[75] Inventors: Charles E. Boice, Endicott; Barbara A. Hall, Endwell; John M. Kaczmarczyk, Endicott; Agnes Yee Ngai, Endwell; Stephen P. Pokrinchak, Owego, all of N.Y.

[73] Assignee: International Business Machines Corporation, Armonk, N.Y.

[21] Appl. No.: 09/008,281

[22] Filed: Jan. 16, 1998

Related U.S. Application Data

[63] Continuation-in-part of application No. 08/948,442, Oct. 10, 1997.

[51] Int. Cl.[6] .................................................. H04N 7/36
[52] U.S. Cl. ................................... 348/412; 348/404
[58] Field of Search ................................. 348/409, 404, 348/405, 411, 412; H04N 7/36

[56] References Cited

U.S. PATENT DOCUMENTS

| | | | |
|---|---|---|---|
| 4,920,426 | 4/1990 | Hatori | 348/405 |
| 5,111,292 | 5/1992 | Kuriacose et al. | 348/384 |
| 5,151,783 | 9/1992 | Faroudja | 348/448 |
| 5,231,484 | 7/1993 | Gonzales et al. | 348/405 |
| 5,325,125 | 6/1994 | Naimpally et al. | 348/402 |
| 5,434,623 | 7/1995 | Coleman | 348/405 |

OTHER PUBLICATIONS

"Sonic DVD Creator–Blueprint for DVD Premastering", Sonic Solutions, Apr. 1996, (pp. 2–10).

*Primary Examiner*—Howard Britton
*Attorney, Agent, or Firm*—Heslin & Rothenberg, P.C.

[57] ABSTRACT

Method, system and computer program product are provided for adaptively encoding in hardware, software or a combination thereof a sequence of video frames in real-time. A first encoding subsystem analyzes the sequence of video frames to derive information on at least one characteristic thereof, such as motion statistics, non-motion statistics, scene change statistics, or scene fade statistics. The gathered information may be either an intraframe characteristic or an interframe characteristic. A control processor is coupled to the first encoding subsystem to automatically analyze the gathered information in real time and dynamically produce a set of control parameters. A second encoding subsystem, coupled to the control processor, then encodes each frame of the sequence of video frames employing the corresponding set of control parameters.

29 Claims, 9 Drawing Sheets

REAL-TIME ENCODING OF VIDEO SEQUENCE EMPLOYING TWO ENCODERS AND STATISTICAL ANALYSIS

CROSS-REFERENCE TO RELATED APPLICATIONS

This application comprises a continuation-in-part application of co-pending, commonly assigned U.S. patent application Ser. No. 08/948,442, filed Oct. 10, 1997, entitled "Adaptive Real-Time Encoding Of Video Sequence Employing Image Statistics," which is hereby incorporated herein by reference in its entirety. Further, this application is related to co-filed, commonly assigned U.S. patent application Ser. No. 09/008,282, entitled "Real-Time Variable Bit Rate Encoding Of Video Sequence Employing Image Statistics," which is hereby incorporated herein by reference in its entirety.

TECHNICAL FIELD

This invention relates in general to compression of digital visual images, and more particularly, to a technique for real-time encoding of a video sequence using image statistics derived from the video sequence to dynamically change one or more controllable encoding parameter(s) from frame to frame or within a frame.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, and variable length coding. Video compression between pictures is accomplished via a process referred to as motion estimation and compensation, in which a motion vector plus difference data is used to describe the translation of a set of picture elements (pels) from one picture to another.

The ISO MPEG-2 standard specifies only the syntax of bitstream and semantics of the decoding process. The choice of coding parameters and tradeoffs in performance versus complexity are left to the encoder developers.

One aspect of the encoding process is compressing a digital video image into as small a bitstream as possible while still maintaining video detail and quality. The MPEG standard places limitations on the size of the bitstream, and requires that the encoder be able to perform the encoding process. Thus, simply optimizing the bit rate to maintain desired picture quality and detail can be difficult.

For example, a bit rate is defined in bits per second. Based on the frame rate and type of picture being encoded, a number of bits per picture is assigned. At 6,000,000 bits per second (6 Mbps), and pictures at 30 picture frames per second, each picture would be allocated 200,000 bits assuming that the bits are allocated uniformly. With a 720×480 picture having 1350 macroblocks, this translates into 148 bits allocated per macroblock. Thus, in the case of scene changes and action videos, the bit rate can be quickly consumed with drastic changes between macroblocks and/or between frames. Picture quality and detail can suffer as a result.

Video compression requires advanced techniques to achieve the highest amount of compression, while still obtaining a desired picture quality. Variable bit rate (VBR) encoding is an option in video compression that allows for each compressed picture to have a different amount of bits based on complexity of intra and inter-picture characteristics. For example, scenes with simple picture content (such as a color test pattern) will require significantly less bits to encode than scenes with complicated picture content (such as a crowded city street) in order to obtain desired picture quality. Because of the amount of information that is needed to characterize the video and the complexity of the algorithms needed to interpret the information to effectively enhance the encoding process, VBR encoding is conventionally accomplished in a non-real-time, two or more pass encoding process. In a first pass, statistics are gathered and analyzed, and in a second pass, the results of the analysis are used to control the encoding process. Although this produces in high quality encoding, it does not allow for real-time operation.

This invention seeks to enhance picture quality of an encoded video sequence while still obtaining a high compression rate by providing a real-time VBR a video encoding scheme.

DISCLOSURE OF THE INVENTION

Briefly summarized, this invention comprises in one aspect a method for encoding a sequence of frames. The method includes: employing a first encoding subsystem to analyze the sequence of video frames and derive information on at least one characteristic thereof, the at least one characteristic being at least one of scene change, picture quality, bits used, target bit rate, and picture type; automatically processing the at least one characteristic in real-time to produce a value for at least one controllable parameter used in encoding the sequence of video frames; and encoding the sequence of video frames employing a second encoding subsystem and using the value of the at least one controllable parameter to produce a bitstream of encoded video data.

In another aspect, the invention comprises a system for encoding a sequence of video frames. The system includes a first encoding subsystem, a control processor and a second encoding subsystem. The first encoding subsystem is employed to analyze the sequence of video frames and derive information on at least one characteristic thereof. The at least one characteristic comprises at least one of scene change, picture quality, bits used, target bit rate, and picture type. The control processor is coupled to the first encoding subsystem for automatically processing in real-time the information on the at least one characteristic to produce a value for at least one controllable parameter used in encoding the sequence of video frames. The second encoding subsystem is coupled to the control processor for receiving the value of the at least one controllable parameter. The second encoding subsystem encodes each frame of the sequence of video frames using the corresponding value of the at least one controllable parameter, thereby producing a bitstream of encoded video data.

In a further aspect, the invention comprises a computer program product including a computer usable medium having computer readable program code means therein for use in encoding a sequence of video frames. The computer readable program code means in the computer program product includes computer readable program code means for causing a computer to affect: analyzing the sequence of video frames and deriving information on at least one characteristic thereof, the at least one characteristic comprising at least one of scene change, picture quality, bits used, target bit rate, and picture type; automatically processing the at least one characteristic to produce a value for at least one controllable parameter used in encoding the sequence of video frames; and encoding the sequence of video frames using the value of the at least one controllable parameter to produce a bitstream of encoded video data.

In general, encoding in accordance with the principles of the present invention results in improved picture quality compared with non-adaptive encoder systems, especially at low bit rates. This is because, for example, employing adaptive bit allocation among frames (as well as within frames) is more critical in low bit rate encoding compared with higher bit rate encoding. The present invention comprises a real-time video data encoding approach which employs two encoders and real-time statistical processing. The statistical processing is accomplished within a processor coupled between the first encoder and the second encoder to analyze the statistics produced by the first encoder and to develop encoding parameters for the second encoder. The second encoder then uses the enhanced encoding parameters to provide a high quality, highly compressed video stream. The MPEG-2 Standard is assumed; however, the concepts presented herein can apply to other standards as well. Further, the encoding technique of this invention can insure a semi-constant picture quality of a decoded video sequence in constant bit rate (CBR) mode or a constant picture quality in variable bit rate (VBR) encoding mode.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
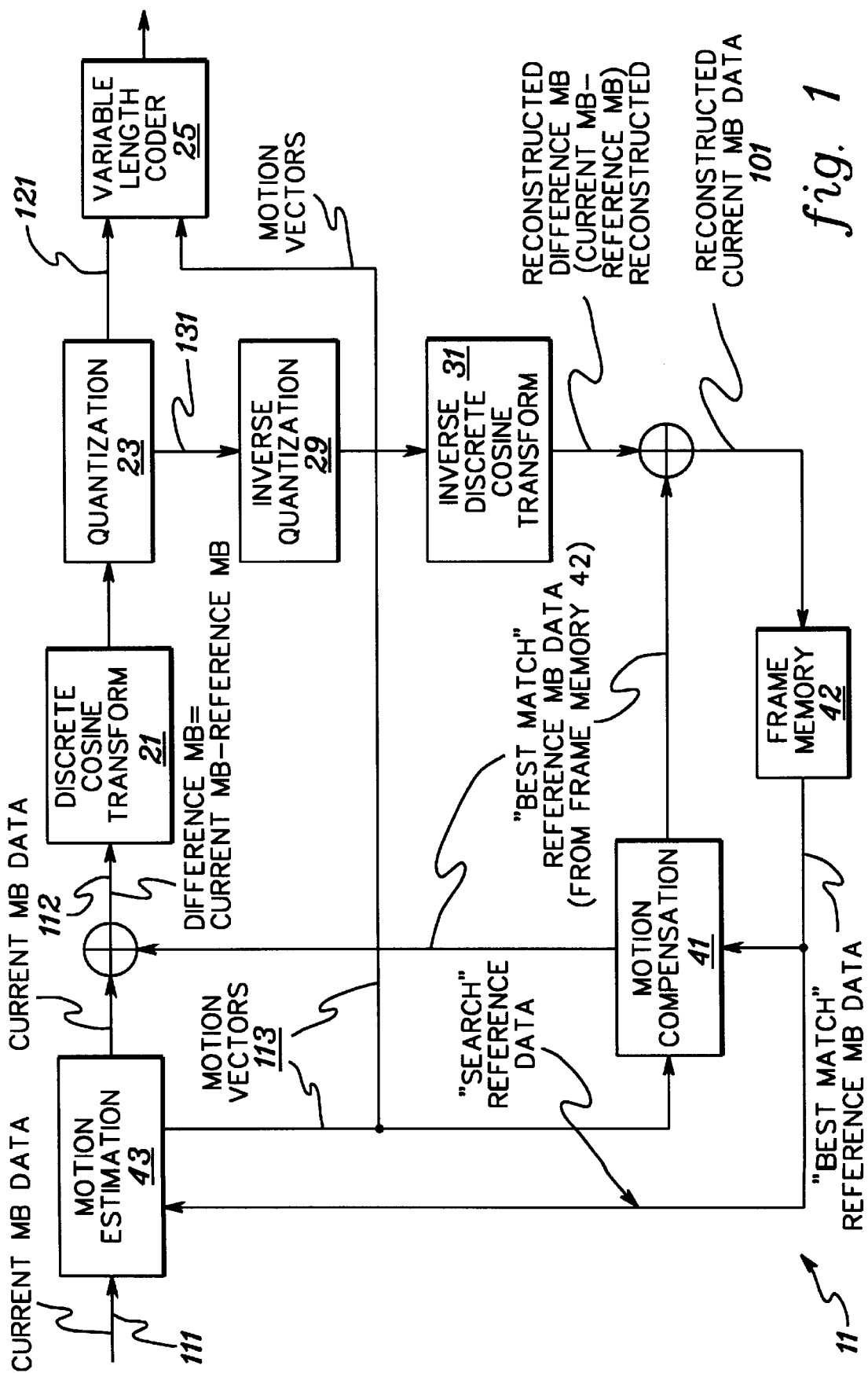
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

The invention relates, for example, to MPEG compliant encoders and encoding processes such as described in "Information Technology-Generic coding of moving pictures and associated audio information: Video," Recommendation ITU-T H.262, ISO/IEC 13818-2, Draft International Standard, 1994. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in a still picture of an "I" frame picture. Spatial redundancy is the redundancy within a picture. The MPEG-2 Draft Standard is using a block based method of reducing spatial redundancy. The method of choice is the discrete cosine transformation, and discrete cosine transform coding of the picture. Discrete cosine transform coding is combined with weighted scalar quantization and run length coding to achieve desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the ithpicture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation Unit 41 to retrieve macroblock data from previous and/or future pictures, referred to as "reference" data, for output by this unit. One output of the motion compensation Unit 41 is negatively summed with the output from the motion estimation unit 43 and goes to the input of the Discrete Cosine Transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
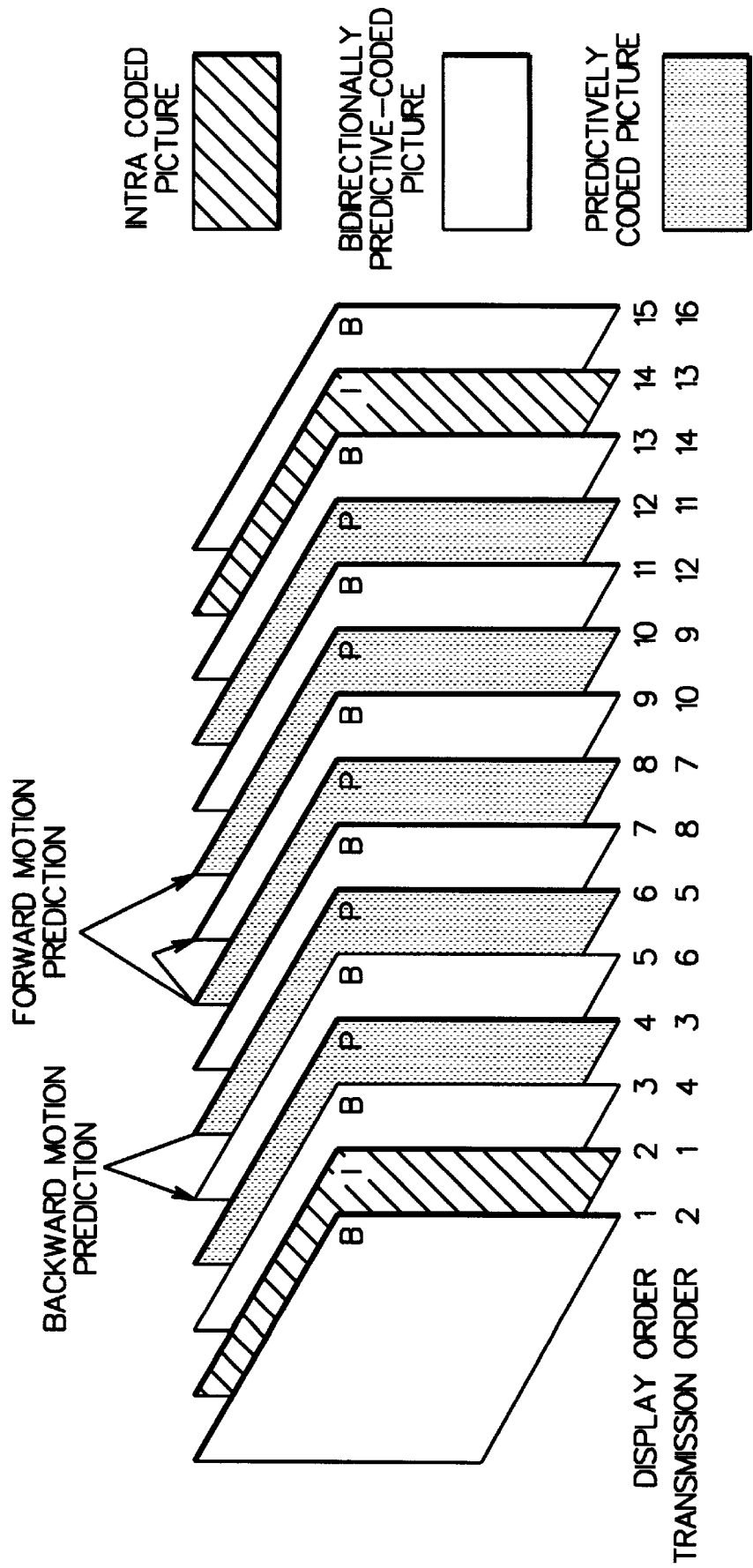
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
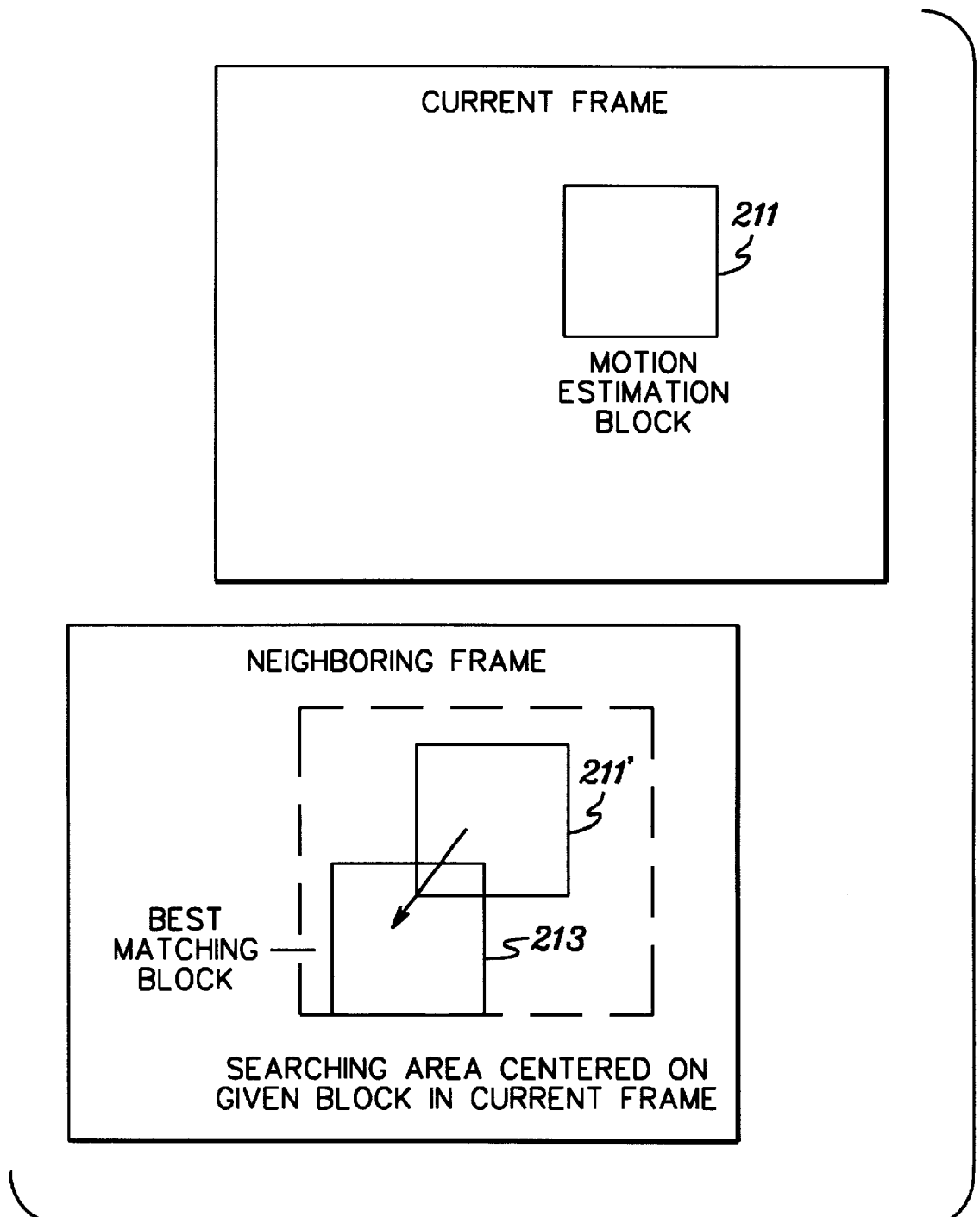
FIG. 3 illustrates the search from the motion estimation block in the current frame or picture to the best matching block in a subsequent or previous frame or picture. Elements 211 and 211' represent the same location in both pictures.
Figure 4:
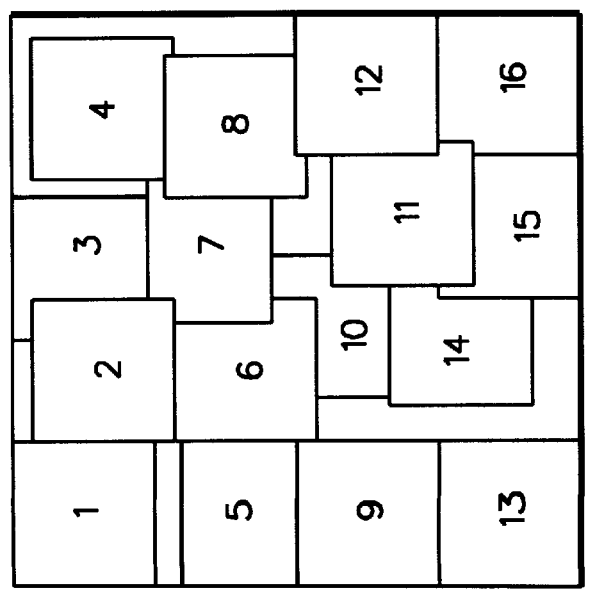
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the i+1$^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in detail in commonly assigned, co-pending U.S. patent application Ser. No. 08/831,157, by Carr et al., filed Apr. 1, 1997, entitled "Control Scheme For Shared-Use Dual-Port Predicted Error Array," which is hereby incorporated herein by reference in its entirety.

As noted initially, encoder performance and/or picture quality may be enhanced in accordance with the principles of this invention through real-time adaptive video encoding. The video encoder is constructed to be adaptive to the video data received as a sequence of frames. In accordance with one embodiment of this invention, two encoding subsystems are employed. A significant advantage of using two encoding subsystems is the ability to analyze the video sequence prior to its real-time encoding. Analysis of the video sequence comprises calculating one or more statistics which can be derived from the video data.

The statistical measures can describe different characteristics of an image frame, for example, busyness of a frame, motion between image frames, scene change or fading, etc. Using the calculated statistics, adaptive encoding of the video sequence is then carried out by controlling one or more encoding parameters of the real-time encoding process. For example, bit allocation, quantization parameter(s), encoding mode, etc., can be changed from frame to frame or macroblock to macroblock within a given frame according to derived statistics of a characteristic (e.g., scene content) of the particular frame(s).

Figure 5:
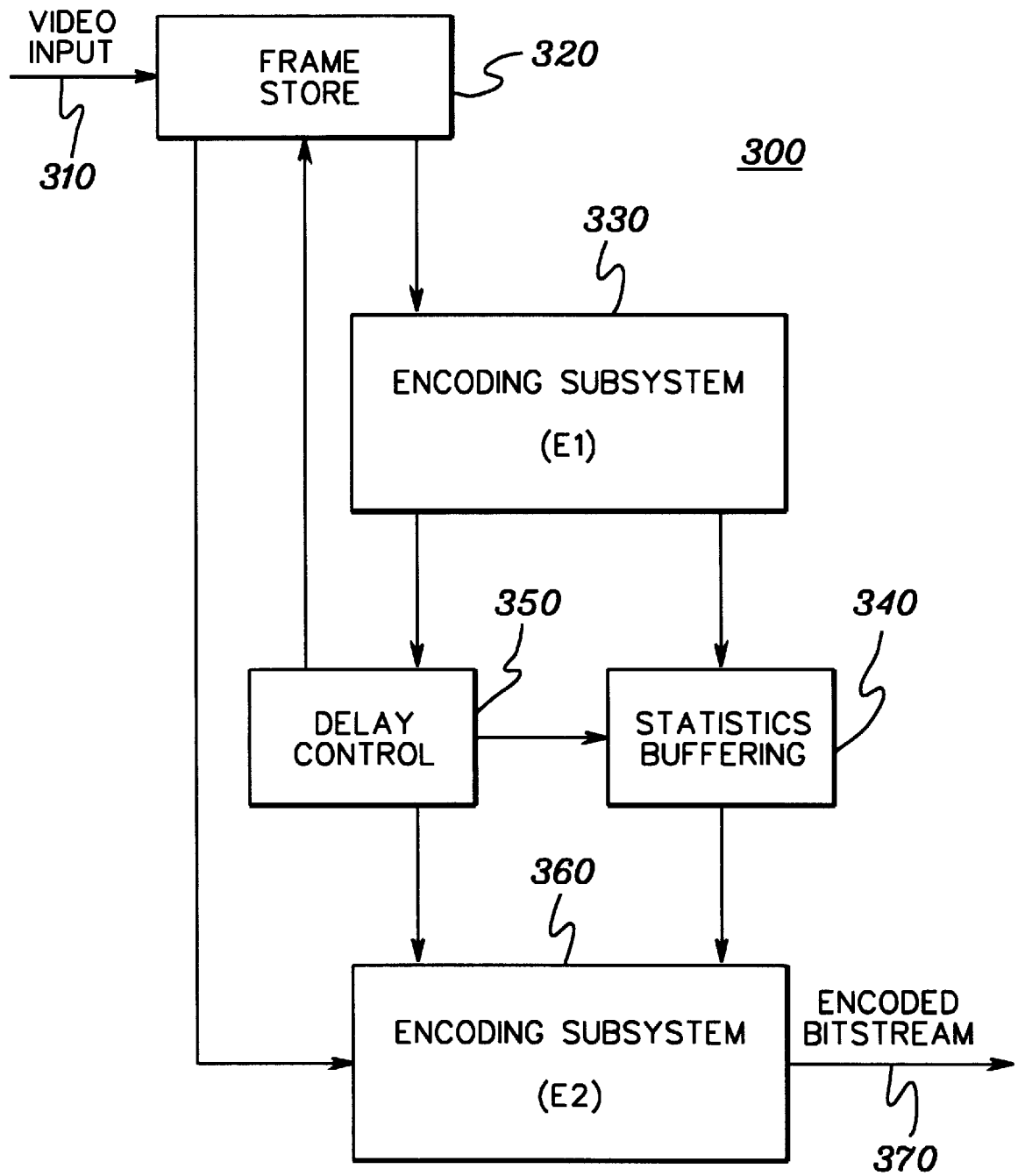
FIG. 5 shows a flow diagram of an encoding system 300 employing a first encoding subsystem E1 and a second encoding subsystem E2 in accordance with the principles of the present invention. Subsystem E1 is configured to derive statistics on one or more characteristics of a sequence of frames to be encoded. These characteristics are employed by subsystem E2 to adaptively encode the sequence of frames to optimize picture quality and/or encoding performance.

One embodiment of an encoding system, generally denoted 300, in accordance with the principles of this invention is depicted in FIG. 5. The MPEG Standard is again assumed herein for purposes of explanation; however, those skilled in the art will understand that other implementations and standards can employ the adaptive encoding concepts of this invention. System 300 includes two encoder subsystems, designated E1 330 and E2 360. In one implementation, encoder subsystems E1 and E2 are assumed to have identical hardware, but different software as described hereinbelow. E1 is programmed to generate the desired statistics, such as interframe/intraframe non-motion, motion, etc. statistics, which are important to the encoding subsystem's (E2) specific bit rate control algorithm. E2 generates .encoded frames based on the statistics generated by encoding subsystem E1.

Operationally, a sequence of video frames 310 is initially received into a frame store 320, where one or more frames are buffered depending upon the encoding specification (e.g., I, IP, IBP, IBBP encoding). This is accomplished by partitioning frame store 320 into an appropriate number of picture buffers (determined by group of picture (GOP) structure). These partitions are managed by a delay control logic 350. After sufficient delay, again determined by implementation, the video frame information is passed to encoder subsystem E1 330, which derives the information on image statistics and stores this information in a statistics buffer 340 on a frame-by-frame basis. The delay control hardware 350 manages buffering of incoming video data and of image statistics, and feeds the video frames from frame store 320, as well as the derived statistics from statistics buffering 340, to encoding subsystem E2 360 in encode order. Using these statistics, subsystem E2 adaptively encodes the frames as described further below and outputs the encoded bitstream 370 in real time, delayed only by sufficient frame time to allow encoding subsystem E1 to generate the statistics on one or more characteristics of the received video input 310.

Figure 6:
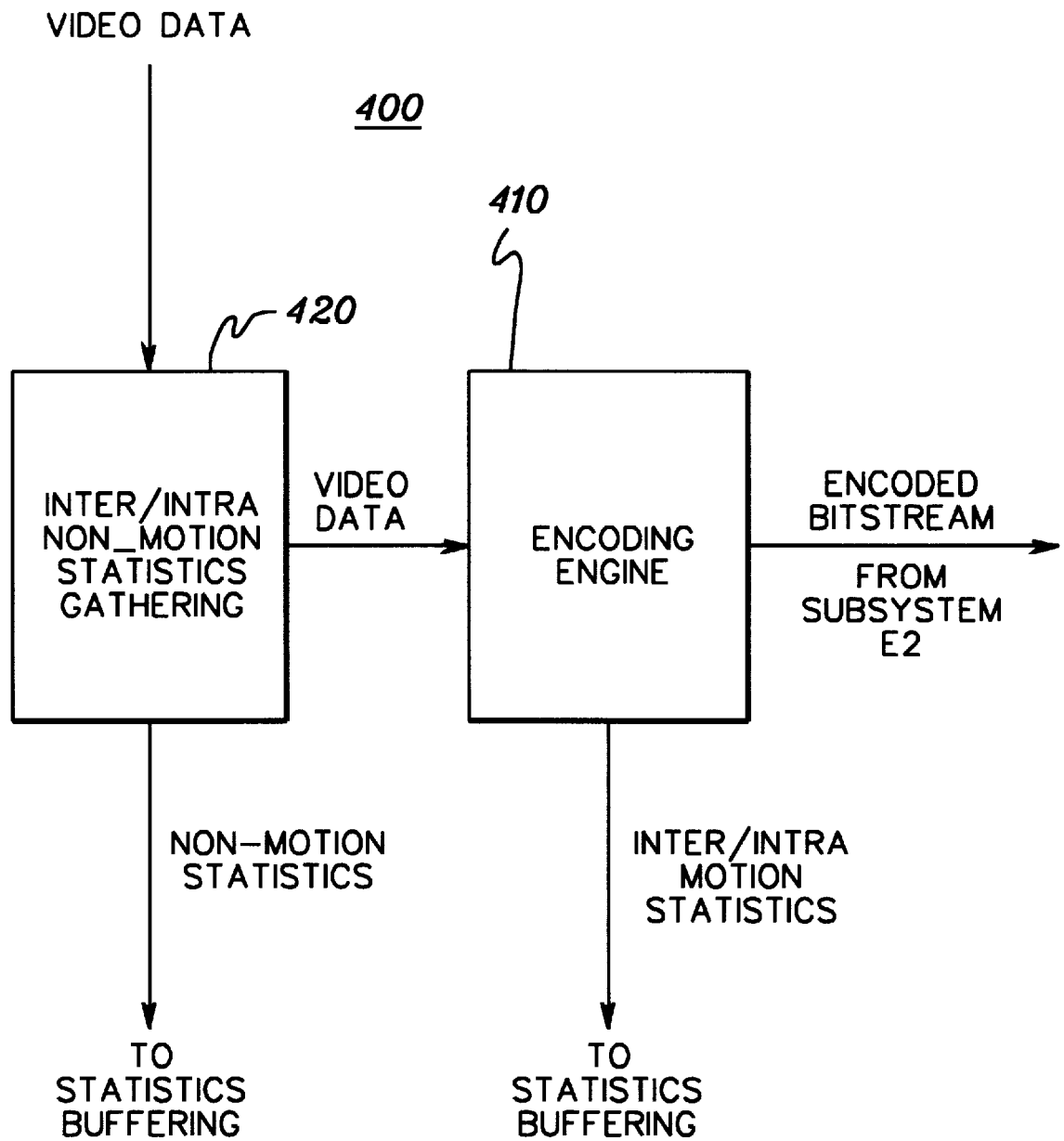
FIG. 6 is a generalized diagram of an encoding subsystem in accordance with the present invention. Subsystem E1 is employed to generate, for example, non-motion statistics and inter/intra motion statistics using non-motion statistics gathering 420 and encoding engine 410, respectively, while subsystem E2 generates the encoded bitstream using encoding engine 410.

A block diagram of a generalized encoding subsystem, denoted 400, is depicted in FIG. 6. System 400 comprises hardware/software for calculating non-motion statistics 420 on the video data as it is received in the encoding subsystem, as well as an encoding engine 410 which consists of hardware/software to perform the actual video compression, i.e., motion estimation, motion compensation, quantization, variable length coding, etc. Encoding subsystem E1 330 (FIG. 5) will employ both statistics gathering logic 420 and encoding engine 410, while encoding subsystem E2 360 (FIG. 5) will only employ encoding engine 410. Thus, during a first pass of encoding, i.e., via subsystem E1, motion statistics based on motion vectors are calculated by encoding engine 410. Encoding subsystem E2 then outputs an encoded bitstream using a second pass through encoding engine 410.

Real time operation, and associated frame delays of a system in accordance with this invention, is demonstrated in the MPEG-2 example of Table 1. In this example, one B picture is assumed between two anchor pictures (IBPBPBP. . .) and non-motion statistics are being collected. Only one frame of video data is buffered before the statistical calculation, and the delay between input and output of the frames is a maximum of four frame times in the example.

TABLE 1

| Input | Buffer1 | Buffer2 | Buffer3 | Buffer4 | Buffer5 | Encoder#1 | Encoder#2 | |
|-------|---------|---------|---------|---------|---------|-----------|-----------|---|
| n     | n       | —       | —       | —       | —       | —         | —         |   |
| n + 1 | n       | n + 1   | —       | —       | —       | n         | —         |   |
| n + 2 | n       | n + 1   | n + 2   | —       | —       | n + 1     | —         |   |
| n + 3 | n       | n + 1   | n + 2   | n + 3   | —       | n + 2     | n         | (I) |
| n + 4 | n       | n + 1   | n + 2   | n + 3   | n + 4   | n + 3     | n + 2     | (P) |
| n + 5 | n + 5   | n + 1   | n + 2   | n + 3   | n + 4   | n + 4     | n + 1     | (B) |
| n + 6 | n + 5   | n + 6   | n + 2   | n + 3   | n + 4   | n + 5     | n + 4     | (P) |
| n + 7 | n + 5   | n + 6   | n + 7   | n + 3   | n + 4   | n + 6     | n + 3     | (B) |
| n + 8 | n + 5   | n + 6   | n + 7   | n + 8   | n + 4   | n + 7     | n + 6     | (P) |
| n + 9 | n + 5   | n + 6   | n + 7   | n + 8   | n + 9   | n + 8     | n + 5     | (B) |

Other implementations will be apparent to those skilled in the art employing the principles of the present invention. For example, video data could be input into a frame store in parallel with inputting it into the first encoding subsystem E1 if the video data has no B pictures and the statistics are intraframe.

Examples of statistics calculated in encoding subsystem E1 are next described.

As noted, encoding subsystem E1 calculates statistics from the image data. Based upon these statistics, the subsystem can also carry out pre-processing steps, such as identifying scene change or fade detection. The particular statistics calculated by subsystem E1 depend on the given implementation of a rate control algorithm within subsystem E2. In MPEG-2 encoding, there is a wide range of picture statistics that can be used to determine the quantization for a frame or within a frame. The statistics discussed hereinbelow are provided by way of example only and other E2 video compression algorithms may employ different picture quantities.

Frame statistics can generally be divided into two groups, i.e., intraframe and interframe statistics. Intraframe statistics are calculated using only pixel data within a frame, while interframe statistics are obtained using several consecutive images from an image sequence (generally two consecutive images). Intraframe and interframe statistics can be further divided into global and local quantities. Global quantities describe characteristics of entire image frames, and local statistical values are calculated for each subdivision of a frame, e.g., for each macroblock of a frame. The statistics presented herein can be calculated from luminance data, however, additional statistics can be derived from chrominance data as well.

Intraframe Statistics:
Global Quantities:
Average Interpixel Difference (AID) of a frame—AID is the average of absolute differences between two consecutive pixels in the image lines of a frame. The higher the AID, the higher the details in a frame. This quantity is calculated by hardware in the pixel interface as pixels for the frame pass through.
Average Activity (AVACT) of a frame—AVACT is estimated as the average of the macroblock variances in a frame. A macroblock variance can be estimated as statistical averages from the pixel values of a macroblock. The average activity gives information about the busyness of a picture.

Local Quantities:
During the calculation of the above global quantities, local measures can also be obtained. Thus, for each subdivision, e.g. macroblock (MB), the MB-AID and MB-AVACT statistics can be stored and then used by subsystem E2 for local adaptive encoding of a frame.

Interframe Statistics:
These statistics describe the relationship between consecutive frames of an image sequence, e.g. occurrence of motion, scene change, fading, or identifying noise in a macroblock.

Global Quantities:
Average Frame Difference (AFD) of a frame—AFD is the average of absolute differences between the luminance pixel value of the current picture and the pixel at the same location in the previous frame.
Variance of the DFD (Displaced Frame Difference)—To obtain DFD at a pixel, motion vectors have to be calculated for each macroblock using two consecutive frames. DFD is the difference between a pixel value at the current frame and the corresponding (displaced by an estimated motion vector) pixel value in the previous or future frame. Variance can be estimated as statistical average of DFDs, which are calculated for each pixel of the entire frame.

Local Quantities:
Variance of DFD for macroblock.
Same as the global quantity, but the variance is estimated for a macroblock.
Variance of motion vectors (difference between neighboring motion vectors)

Scene Change Detection:
Consider two consecutive frames. The above statistics (global and local) are available for each frame. There are different possibilities to detect scene changes; for example:
a) If ((AVACT(i)-AVACT(i-1))>threshold1), then frame i belongs to the new scene. Threshold1 is determined experimentally.
b) If ((AID(i)-AID(i-1))>threshold2) then frame i belongs to the new scene. Threshold2 is determined experimentally.
c) Combination of conditions a) and b).
d) If ((AFD)>threshold3), then frame i belongs to the new scene. Threshold3 is determined experimentally.
e) Scene change detection—interframe statistics. If (DFD variance>threshold4) and if ((AID(i)-AID (i-1)) >threshold2), then frame i belongs to the new scene. Thresholds are determined experimentally. Threshold4 has to be chosen carefully, because only one motion vector is available for a macroblock (MB) and it is not necessarily the true motion vector for each pixel in the MB.

If a scene change is detected, this will be communicated to system E2. Subsystem E2 may react by disregarding any information from the previous picture which belongs to the previous scenes. E2 can also rearrange the encoding modes of the pictures: e.g., the first picture that belongs to the new scene may be coded as an I picture.

Fade Detection:
A fade is basically a slow scene change, whereby the frames change gradually, in contrast to a true scene cut where the change is abrupt. A fade has two directions, 1) the first scene dissolving into the fade, and 2) the fade crystallizing into the second scene.

The presence of a fade and its direction may be determined by a percentage of interpixel sums delta with respect to a previous frame, i.e., if the value of the sum of the pixels of frame N+1 differs by an experimentally determined percentage from frame N, then a fade is occurring. Its direction is determined by the sign of the magnitude, i.e., being greater or less than zero. If a fade is detected, this is communicated to E2.

As noted above, encoder subsystem E2 can have the same encoding engine architecture as encoder subsystem E1, however, the statistics gathering hardware/software would not be employed by subsystem E2. Adaptive encoding of a frame sequence is carried out by the rate control algorithm of the encoding engine, i.e., using the above-generated statistics. This is a 2-step process.

At first, bit allocation is defined for each picture depending on the bit rate, encoding mode and the relative characteristics of the frames to each other. Then, a corresponding quantization parameter (QUANT) is defined. In an MPEG-2 compatible bitstream, the QUANT value can change from macroblock to macroblock allowing locally adaptive quantization inside a frame. In accordance with this invention, a first global QUANT value is defined for each picture using the global quantities described above. The QUANT value for a particular macroblock is then obtained by modulating the global QUANT value based on the local statistics of the macroblock.

By detecting scene change within encoding subsystem E1, and with a prior knowledge of picture statistics, after detection of a scene change information from previous pictures which belongs to the previous scene can be discarded. For example, a new group of pictures (GOP) can be started with the new scene. The global QUANT values can be calculated for the frames of the new GOP using pre-defined initial rate control parameters instead of using parameters from the old scene.

If a fade is detected by subsystem E1, then subsystem E2 may react by using the proper reference frames for motion estimation/compensation, and/or change the encoding mode of frames. An example of this may be forcing an I picture, or coding all macroblocks in a P or B picture as intra-macroblocks.

Locally adaptive quantization is also possible. The aim in this approach would be to distribute allocated bits among the macroblocks based on scene content. One possible approach would be to employ AVACT of the current picture to be encoded. The MB-AVACT for each macroblock are also stored in the statistics buffering. A QUANT value of an MB is obtained by modulating the global QUANT value by the ratio of the AVACT and the MB-AVACT. For example, if the macroblock activity is high with respect to the picture AVACT, then the QUANT of this particular macroblock will be increased with respect to the global QUANT, and vice versa.

Pursuant to the adaptive encoding system of this invention, the local statistics can also be employed to identify noisy macroblocks within a picture. If a macroblock has a high DFD value and its activity is also high, the macroblock can be declared noisy. A noisy macroblock can then be encoded by a high QUANT value, which results in bit savings. These extra bits can be used for encoding noiseless macroblocks within the frame. Consequently, the overall quality of the picture will be improved.

One example of a manner in which the encoding system of this invention performs the function of locally adaptive quantization may be the following. To determine the quantization value for each macroblock, the encoding subsystem would receive the MB-AVACT and DFD from the statistics store 340 (FIG. 5) for that macroblock. Subsystem E2 would then use these values in determining the most efficient QUANT value for the macroblock.

Figure 7:
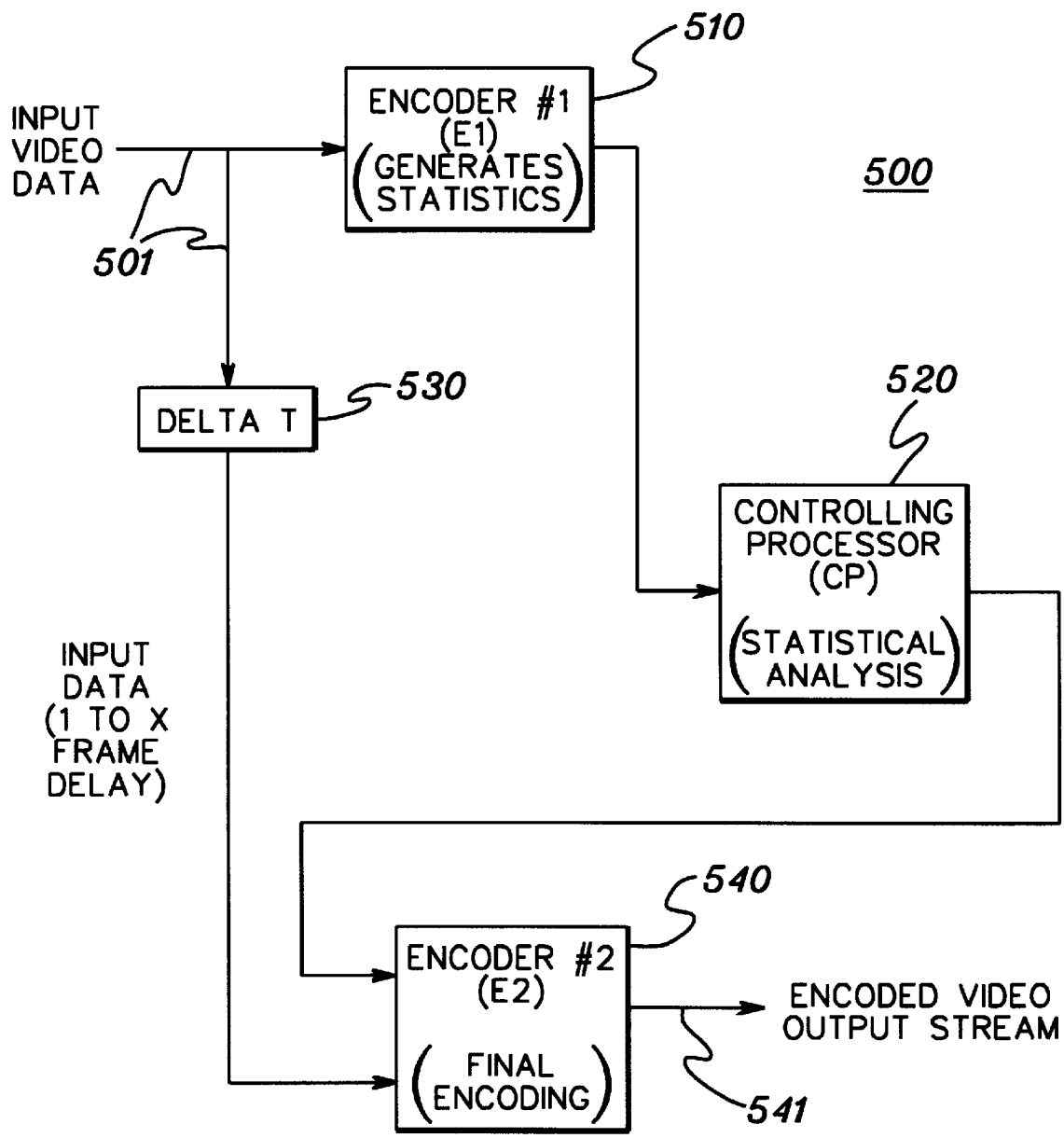
FIG. 7 is a block diagram of an alternate embodiment of an encoding system 500 in accordance with the principles of this invention. System 500 employs a first encoding subsystem E1 510 and a second encoding subsystem E2 540 coupled via a controlling processor 520. Subsystem E1 is configured to derive statistics on one or more characteristics of a sequence of frames to be encoded. These characteristics are statistically analyzed by controlling processor 520 to dynamically develop a value for one or more controllable parameters to be used by subsystem E2 in encoding a current frame of the sequence of frames, thereby optimizing picture quality and/or encoding performance.

Further aspects of an encoding system/method in accordance with the principles of the present invention are next described below with references to FIGS. 7–9. In this enhanced embodiment, the invention comprises real-time encoding of video data using two encoders and a controlling processor. As shown in FIG. 7, a first encoder, E1 510 receives input video data 501 and generates statistics therefrom for forwarding to a controlling processor (CP) 520. More particularly, encoding subsystem E1 receives the uncompressed video data and derives statistics describing the current picture and its relation to other pictures in the sequence of video data.

The controlling processor 520 then uses statistical techniques (described below) to analyze the generated statistics to develop one or more encoding parameters for use by encoding subsystem E2 540. Encoding subsystem E2 uses the enhanced encoding parameter(s) to produce a high quality, highly compressed video stream 541 in real time. Encoding subsystem E2 also receives a delayed 530 version of the input video data 501 which is synchronized to the enhanced encoding parameter(s) received from controlling processor 520 so that subsystem E2 encodes each frame using its associated enhanced encoding parameter(s) from the controlling processor.

The statistics produced by encoding subsystem E1 can be based on information provided with the picture (intra-frame) or information collected based on differences between multiple pictures (inter-frame) as discussed above. Examples of intra-frame statistics are: (1) picture complexity; (2) bit count; and (3) signal-to-noise ratio (SNR). Examples of inter-frame statistics include: (1) motion vectors; (2) motion detection; (3) repeat fields; (4) prediction error; and (5) scene changes. Techniques which can be employed for determining these statistics will be understood by those skilled in the art.

The controlling processor employs the statistics from encoding subsystem E1 to perform a statistical analysis routine to generate one or more parameters to control the encoding process of the second encoding subsystem E2. Examples of controllable parameters include: bits per picture; picture type; notification of repeat fields; field or frame encoding; maximum amount of motion between frames (search window); and/or a quantization parameter (Mquant).

Figure 8:
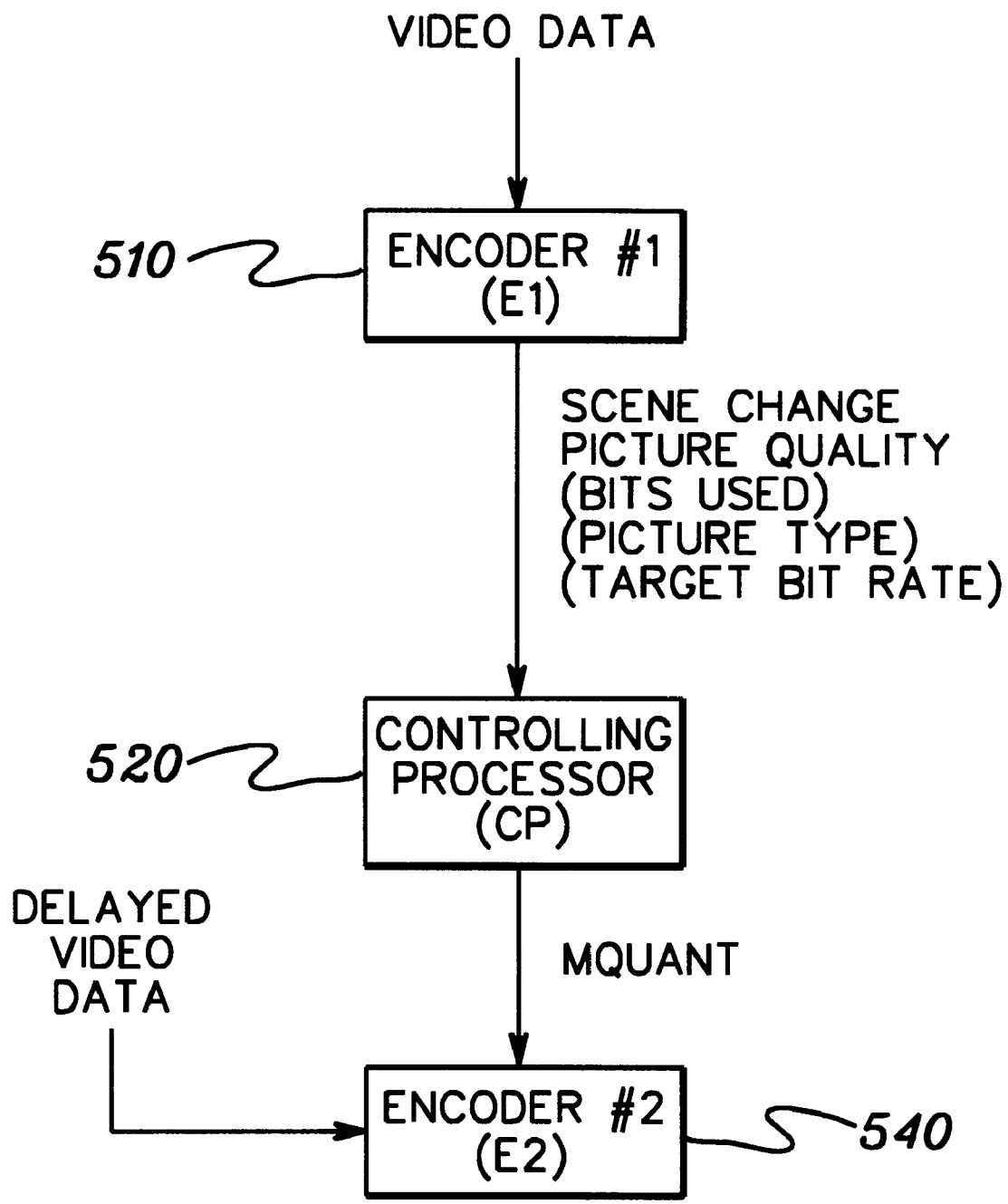
FIG. 8 is a generalized flow diagram pursuant to the present invention, wherein a sequence of video data is input to subsystem E1, which produces information on scene change, picture quality, bits used, picture type and/or target bit rate. This information is forwarded to controlling processor (CP) 520, which in this example provides a quantization parameter (Mquant) to the second encoding subsystem E2 540. Subsystem 540 also receives as input a synchronized, delayed version of the sequence of video data.

FIG. 8 depicts one embodiment of a processing routine wherein the sequence of video data is analyzed within encoding subsystem E1 510 to determine whether a scene change has occurred, and to provide a measure of picture quality. These statistics (along with possibly bits used, picture type and target bit rate) are provided to the controlling processor (CP) 520 which in this example, develops therefrom a quantization parameter (Mquant) that is provided to the second encoding subsystem E2 540. Encoding subsystem E2 receives a delayed version of the sequence of video data used by encoding subsystem E1 and produces therefrom the encoded video bitstream.

Figure 9:
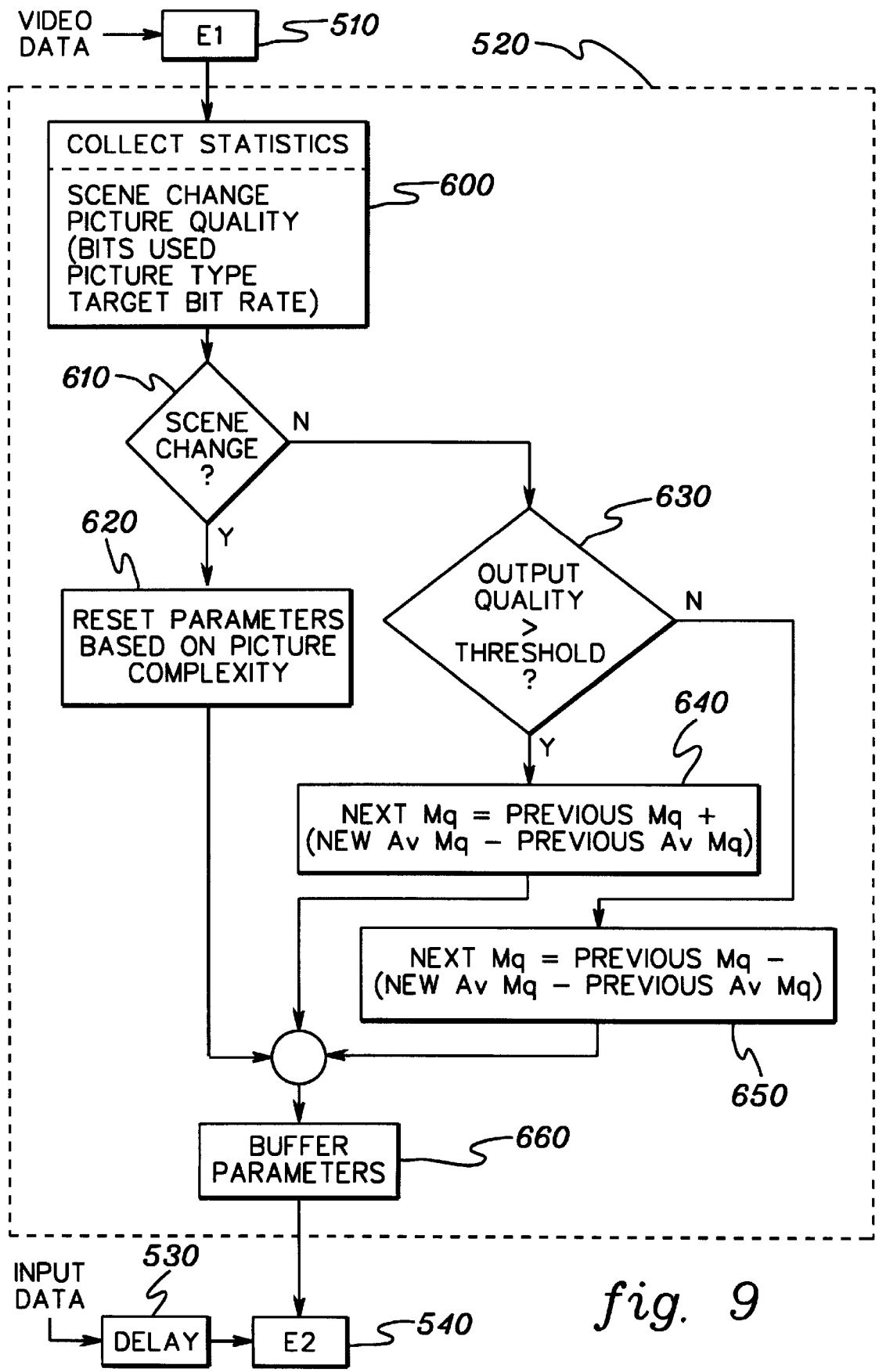
FIG. 9 is a flowchart of one embodiment of statistical processing performed by controlling processor (CP) in developing one or more parameters for use in controlling encoding of the sequence of video data by the second encoding subsystem E2.

FIG. 9 depicts an example of a statistical technique or processing routine implemented within controlling processor 520. The main function of the controlling processor in this example is to determine a new set of encoder parameters for a new picture based on statistics of the last encoded picture and the history of previously encoded pictures within a given scene. The new set of encoder parameters allows the second encoding subsystem to produce a constant quality picture with variable output bit rate.

The input video data to encoding subsystem E2 is identical to that to encoding subsystem E1, with the exception of a delay 530. The delay allows encoding subsystem E1 to process, for example, two pictures to initially generate an average value for one or more characteristics of the pictures. This delay also allows the controlling processor time to analyze the statistics from encoding subsystem E1 and generate a set of new parameters for the current picture to be processed within encoding subsystem E2.

The controlling processor preferably collects statistics on every picture processed within encoding subsystem E1. This collection of statistics 600 includes in one embodiment scene change and picture quality statistics. Other statistics which might be considered include bits used, picture type, target bit rate, average picture Mquant, etc. In the routine of FIG. 9, the controlling processor first identifies if a given picture has content similar to a last picture, or if the current picture belongs to a new scene 610. If the current picture does not belong to the same scene, then encoding parameters are reset based on picture complexity of the current picture 620. These reset encoding parameters are provided to a buffer 660 to await output to and use by the second encoding subsystem 540 as described above.

If the current picture's content is similar to that of the previous picture, i.e., there is no scene change, then the encoding parameters can be based on information from the previous pictures of the same type in the scene. For example, the routine of FIG. 9 employs "picture quality" to define one or more parameters. The picture quality indicates whether excessive bits were used by the first encoding subsystem E1 to encode the current picture. (The encoding parameters used by subsystem E1 could be those used by subsystem E2 to encode the previous frame or they might comprise a reference set of parameters).

A picture quality threshold is predefined and can be derived experimentally by one skilled in the art. For example, the threshold can be defined based on a desired bit rate and picture content. A method of measuring picture quality could be determining a signal-to-noise ratio. A typical reasonable signal-to-noise ratio is in the range of 30 to 40 db. In one embodiment, "picture quality" may be determined by comparing an encoded and decoded version of the frame to the original version of the frame input to the first encoding subsystem E1. The controlling processor initially determines whether the current picture quality (i.e., output quality from E1) exceeds the predefined threshold 630. If the threshold is exceeded, the amount of bits spent on the current picture can be conserved for more complex pictures in the sequence of video data.

By way of example, the controlling processor collects and accumulates picture statistics such as average Mquant, average quality, and average bits used by pictures of a given scene. These statistics on a newly E1 encoded picture of a current scene are compared with average scene statistics to determine how the coding parameters of the current picture should be refined. The controlling processor thus learns from the scene's history and adjusts the controlling parameters of the current picture for use by the second encoding subsystem E2.

The amount of adjustment is related in this example to the most recent Mquant (herein "previous Mq") and the average Mquant (herein "Av Mq") of the same picture types. When the quality is higher than target quality threshold, the Mquant must be increased to lower bit consumption. The opposite applies when the quality is lower than target quality threshold. The amount of increase or decrease is the difference between the updated average Mquant and the previous average Mquant. This increment provides a convergence towards the target quality threshold.

Thus, when the picture quality exceeds the predefined threshold, the current Mquant to be employed by the second encoding subsystem (i.e., "next Mq") is defined as the most recent Mquant (previous Mq) plus the difference of a new average Mquant minus the previous average Mquant. The new average Mquant comprises an average Mquant averaged over the history of the pictures of the same picture types in the current scene up to and including the current picture to be encoded by the second encoding subsystem. The previous average Mquant is the average Mquant over the pictures in the scene of the same picture type prior to the current picture. The same difference quantity is employed as the offset if the output quality from the first encoding subsystem is less than the predefined threshold. Only in this case, the difference quantity is subtracted from the previous Mquant 650 in order to lower the Mquant to be used by the second encoding subsystem and thereby increase picture quality. As shown in FIG. 9, the next or current Mquant is buffered 660 for use by the second encoding subsystem E2.

When a current picture is the start of a new scene, the old history is not applicable. Therefore, a new set of control parameters must be ascertained based on the current picture complexity. This new set of control parameters is then applied to the first encoding subsystem E1 to generate statistics which are collected and refined based on output quality. Control parameters for the second picture of the scene within the encoding subsystem E1 are therefore adjusted upward or downward according to the output of the first picture in the scene. The output statistics of pictures 1 and 2 are weight averaged to form the starting history for the new scene, and the control parameters of picture 1 are derived as described above for the second encoding subsystem E2.

The Mquant of each picture type following a scene change is based on the Mquant of the I picture following the scene change. For example, the initial Mquant for a P picture can be defined as 1.2 _Mquant (I) and the initial Mquant for a B picture can be 2 _Mquant Mquant (I). Once the Mquant values per picture type have been initialized, the subsequent Mquant values are based on the average of the previous Mquant of the same picture type and the complexity of the current picture. A history of Mquants is collected per picture type and is refined until a scene change occurs, where the Mquants are re-initialized.

As noted, a synchronously delayed version of the video encoding sequence (input data) is provided to the second encoding subsystem E2 where the actual encoding is performed. The delay can vary from as little as one frame to as many frames as the system can store in memory. For applications where statistical analysis across a large number of frames is desired, buffering of many video frames may become impractical. However, by using two video sources and delaying the start of the source feeding the second encoding subsystem E2, a greater frame delay can be realized without the addition of a large amount of memory. With these techniques, real-time data can be encoded by appropriate adjustment of delayed input data and the statistics. In a final step, the second encoding subsystem E2 accepts the encoding parameters from the controlling processor and applies them to the current picture to produce a high quality, low bit rate MPEG-2 variable bit rate (VBR) compressed video stream. Although the above invention is described for a VBR application, those skilled in the art will realize that the techniques described can be extended to improve the quality of constant bit rate (CBR) encoding. This can be done by tuning the statistical analysis and encoding parameters for CBR applications.

Those skilled in the art will note from the above discussion that encoding in accordance with the principles of the present invention results in improved picture quality compared with non-adaptive encoder systems, especially at low bit rates. This is because employing adaptive bit allocation among frames, as well as within frames, is more critical in low bit rate encoding compared with higher bit rate encoding. Further, the encoding technique of this invention can insure a semi-constant picture quality of a encoded/decoded video sequence in constant bit rate (CBR) mode or a constant picture quality in variable bit rate (VBR) encoding mode.

In addition, the present invention can be included, for example, in an article of manufacture (e.g., one or more computer program products) having, for instance, computer usable media. The media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. For instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

We claim:

1. A method for encoding a sequence of video frame comprising:
   (a) employing a first encoding subsystem to analyze the sequence of video frames and derive information on at least one characteristic thereof, said at least one characteristic comprising at least one of scene change, picture quality, bits used, target bit rate, and picture type;
   (b) automatically processing said at least one characteristic to produce a value for at least one controllable parameter used in encoding the sequence of video frames; and
   (c) encoding the sequence of video frames employing a second encoding subsystem and using said value of said at least one controllable parameter to produce a bitstream of encoded video data.

2. The method of claim 1, further comprising implementing said employing (a), automatically processing (b), and encoding (c) in real time.

3. The method of claim 1, wherein said at least one characteristic comprises scene change and said automatically processing (b) comprises automatically evaluating each frame for scene change, and upon detection of scene change disregarding information from previous frames of the sequence of video frames in determining said value for said at least one controllable parameter used in encoding the sequence of video frames.

4. The method of claim 3, wherein said at least one characteristic further comprises picture quality, and wherein said automatically processing (b) comprises for each frame automatically comparing picture quality to a predefined threshold if scene change is undetected for said frame.

5. The method of claim 4, wherein said automatically processing (b) further comprises setting said value for said at least one controllable parameter such that a number of bits for encoding (c) each frame is increased if said picture quality is less than said predefined threshold and is decreased if said picture quality is greater than said predefined threshold.

6. The method of claim 5, wherein said at least one controllable parameter comprises a quantization parameter, and wherein for each frame if said picture quality is less than said predefined threshold, said quantization parameter is defined as a previous quantization parameter of a prior frame of the sequence of video frames less a difference between a new average quantization parameter and a prior average quantization parameter, wherein said new average quantization parameter comprises an average quantization parameter for all frames of a current scene including the current frame and said previous average quantization parameter comprises an average quantization parameter for all frames of the current scene prior to the current frame, and wherein if said picture quality is greater than said threshold, said quantization parameter is defined as the previous quantization parameter of the prior frame plus the difference between the new average quantization parameter and the previous average quantization parameter.

7. The method of claim 5, further comprising buffering said value for said at least one controllable parameter and providing said encoding (c) with the sequence of video frames in synchronous delay to said buffering to insure concurrent presence of a current frame and its corresponding value for said at least one controllable parameter at said second encoding subsystem.

8. The method of claim 1, wherein said automatically processing (b) comprises automatically determining said value for said at least one controllable parameter for a current frame of the sequence of video frames using statistics on a prior encoded frame and a history of all prior encoded frames of the same picture type in a current scene containing the current frame to be encoded.

9. The method of claim 1, wherein said employing (a) comprises deriving information on the sequence of video frames from at least one of luminance data and chrominance data of the sequence of video frames.

10. The method of claim 1, further comprising delaying the sequence of video frames input to said encoding (c) and controlling timing of said employing (a), automatically processing (b) and encoding (c) so that for each frame of the sequence of video frames said employing (a) and automatically processing (b) precede said encoding (c) to insure presence of its corresponding value of said at least one controllable parameter at said second encoding subsystem employed in said encoding (c).

11. The method of claim 1, wherein said at least one controllable parameter employed by said encoding (c) comprises at least one of a quantization parameter, a bit allocation, or an encoding mode.

12. A system for encoding a sequence of video frames comprising:
   a first encoding subsystem to analyze the sequence of video frames and derive information on at least one characteristic thereof, said at least one characteristic comprising at least one of scene change, picture quality, bits used, target bit rate, and picture type;
   a control processor coupled to said first encoding subsystem for automatically processing in real time said information on said at least one characteristic to produce a value for at least one controllable parameter used in encoding the sequence of video frames; and
   a second encoding subsystem coupled to said control processor to receive said value of said at least one controllable parameter, wherein said second encoding subsystem encodes the sequence of video frames using said value of said at least one controllable parameter to produce a bitstream of encoded video data.

13. The system of claim 12, wherein said bitstream of encoded video date produced by said second encoding subsystem comprises a variable bit rate bitstream or a constant bit rate bitstream.

14. The system of claim 12, wherein said first encoding subsystem, said control processor and said second encoding subsystem each operate in real time.

15. The system of claim 12, wherein said at least one characteristic comprises scene change and said control processor comprises means for automatically monitoring each frame of the sequence of video frames for scene change, and upon detection of scene change disregarding information from one or more previous frames of the sequence of video frames in determining said value for said at least one controllable parameter.

16. The system of claim 15, wherein said at least one characteristic further comprises picture quality, and wherein said control processor comprises means for automatically comparing picture quality of each frame to a predefined threshold if scene change is undetected at said frame.

17. The system of claim 16, wherein said control processor further comprises means for automatically setting said value for said at least one controllable parameter such that a number of bits used by said second encoding subsystem in encoding said frame is increased if said picture quality is less than said predefined threshold and is decreased if said picture quality is greater than said predefined threshold.

18. The system of claim 17, wherein said at least one controllable parameter comprises a quantization parameter, and wherein for each frame if said picture quality is less than said predefined threshold, said control processor comprises means for defining said quantization parameter as a previous quantization parameter of a prior frame of the sequence of video frames less a difference between a new average quantization parameter and a prior average quantization parameter, wherein said new average quantization parameter comprises an average quantization parameter for all frames of a current scene including the current frame, and said previous average quantization parameter comprises an average quantization parameter for all frames of the current scene prior to the current frame, and wherein if said picture quality is greater than said threshold, said control processor comprises means for defining said quantization parameter as the previous quantization parameter of the prior frame plus the difference between the new average quantization parameter and the prior average quantization parameter.

19. The system of claim 17, further comprising means for buffering said value for said at least one controllable parameter and means for providing said sequence of video frames to said second encoding subsystem in synchronous delay with said buffering to insure concurrent presence of a current frame and its corresponding value for said at least one controllable parameter at said second encoding subsystem.

20. The system of claim 12, wherein said control processor comprises means for automatically determining said value for said at least one controllable parameter for a current frame of the sequence of video frames using statistics on a prior encoded frame and a history of all prior encoded frames of a same picture type in a current scene containing the current frame to be encoded.

21. The system of claim 12, wherein said at least one controllable parameter employed by said second encoding subsystem comprises at least one of a quantization parameter, a bit allocation, or an encoding mode.

22. Computer program product comprising a compute usable medium having computer readable program code means therein for use in encoding a sequence of video frames, said computer readable program code means in said computer program product comprising:

computer readable program code means for causing a computer to affect analyzing of the sequence of video frames to derive information on at least one characteristic thereof, said at least one characteristic comprising at least one of scene change, picture quality, bits used, target bit rate, and picture type;

computer readable program code means for causing a computer to affect automatically processing of the at least one characteristic to produce a value for at least one controllable parameter used in encoding the sequence of video frames; and computer readable program code means for causing a computer to affect encoding the sequence of video frames using said value of said at least one controllable parameter to produce a bitstream of encoded video data.

23. The computer readable program code means of claim 22, wherein said at least one characteristic comprises scene change and said computer readable program code means for causing a computer to affect automatically processing comprises computer readable program code means for causing a computer to affect automatically monitoring each frame for scene change, and upon detection of scene change disregarding information from previous frames of the sequence of video frames in determining said value for said at least one controllable parameter.

24. The computer readable program code means of claim 23, wherein said at least one characteristic further comprises picture quality, and wherein said computer readable program code means for causing a computer to affect automatically processing comprises computer readable program code means for causing a computer to affect automatically comparing picture quality of each frame to a predefined threshold if scene change is undetected for said frame.

25. The computer readable program code means of claim 24, wherein said computer readable program code means for causing a computer to affect automatically processing further comprises computer readable program code means for causing a computer to affect setting said value for said at least one controllable parameter such that a number of bits used in encoding said frame is increased if said picture quality is less than said predefined threshold and is decreased if said picture quality is greater than said predefined threshold.

26. The computer readable program code means of claim 25, wherein said at least one controllable parameter comprises a quantization parameter, and wherein for each frame if said picture quality is less than said predefined threshold, said quantization parameter is defined by said computer readable program code means for causing a computer to affect automatically processing as a previous quantization parameter of a prior frame of the sequence of video frames less a difference between a new average quantization parameter and a prior average quantization parameter, wherein said new average quantization parameter comprises an average quantization parameter for all frames of a current scene including the current frame and said previous average quantization parameter comprises an average quantization parameter for all frames of the current scene prior to the current frame, and wherein if said picture quality is greater than said threshold, said quantization parameter is defined as the previous quantization parameter of the prior frame plus the difference between the new average quantization parameter and the previous average quantization parameter.

27. The computer readable program code means of claim 25, further comprising computer readable program code means for buffering said value for said at least one controllable parameter and providing said computer readable program code means for causing a computer to affect encoding with the sequence of video frames in synchronous delay to said buffering to insure concurrent availability of a current frame and its corresponding value for said at least one controllable parameter.

28. The computer readable program code means of claim 22, wherein said computer readable program code means for causing a computer to affect automatically processing comprises computer readable program code means for causing a computer to affect automatically determining said value for said at least one controllable parameter for a current frame of the sequence of video frames using statistics on a prior encoded frame and a history of all prior encoded frames of a same picture type in a current scene containing the current frame to be encoded.

29. The computer readable program code means of claim 22, wherein said at least one controllable parameter comprises at least one of bit allocation, a quant zation parameter, or an encoding mode.

* * * * *

UNITED STATES PATENT AND TRADEMARK OFFICE
CERTIFICATE OF CORRECTION

PATENT NO. : 5,978,029
DATED : November 02, 1999
INVENTOR(S) : Boice et al.

It is certified that error appears in the above-identified patent and that said Letters Patent is hereby corrected as shown below:

IN THE CLAIMS:

Claim 22, Col. 17, line 52, delete "Computer program" and replace with --A computer program--.

Claim 22, Col. 17, line 52, delete "a compute" and replace with --a computer--.

Claim 29, Col. 20, line 5, delete "quant zation" and replace with --quantization--.

Signed and Sealed this

Twenty-third Day of May, 2000

Attest:

Q. TODD DICKINSON

Attesting Officer     Director of Patents and Trademarks